United States Patent [19]

Enomoto et al.

[11] Patent Number: 5,113,457
[45] Date of Patent: May 12, 1992

[54] IMAGE INFORMATION CODE PROCESSING SYSTEM

[75] Inventors: Hajime Enomoto, Funabashi, Japan; Ming-Kou Chou, Taipei Hsien, Taiwan

[73] Assignee: Fujitsu Limited, Kawasaki, Japan

[21] Appl. No.: 173,726

[22] Filed: Mar. 25, 1988

[30] Foreign Application Priority Data

Mar. 25, 1987 [JP] Japan .................. 62-70727

[51] Int. Cl.⁵ .............................................. G06K 9/36
[52] U.S. Cl. ...................................... 382/56; 358/433; 358/456
[58] Field of Search ................. 382/56; 358/433, 133, 358/456, 135

[56] References Cited

U.S. PATENT DOCUMENTS

| | | | |
|---|---|---|---|
| 3,956,578 | 5/1976 | de Loye et al. | 358/433 |
| 4,028,731 | 6/1977 | Arps et al. | 358/433 |
| 4,280,143 | 7/1981 | Judd | 358/433 |
| 4,325,085 | 4/1982 | Gooch | 382/56 |
| 4,409,623 | 10/1983 | Kobayashi et al. | 358/433 |
| 4,577,227 | 3/1986 | Gurumurthy | 358/147 |
| 4,593,374 | 6/1986 | Gurumurthy | 364/900 |
| 4,606,069 | 8/1986 | Johnsen | |
| 4,802,232 | 1/1989 | Altes | 382/56 |

OTHER PUBLICATIONS

Hunter, Roy and Robinson, A. Harry: "International Digital Facsimile Coding Standards", Proc. IEEE, vol. 68, No. 7, pp. 854-867 (Jul. 1980).

Enomoto and Choud: "Coding of graphics by using prime implicant representation" Picture Coding Symposium, Tokyo Institute of Technology (1984).

Primary Examiner—David K. Moore
Assistant Examiner—Jose L. Couso
Attorney, Agent, or Firm—Staas & Halsey

[57] ABSTRACT

An image information code processing system in this invention compresses and encodes a 2-valued image information in a facsimile, etc. For example, an image is expressed by a set of component patterns using bit patterns of divided 4×4 bit rectangular blocks, and a codeword train of matched codewords of the component patterns are determined as a block code. In this system, using a four times expanded block process, one block code of the expanded block is determined, then the system expands to determine a partial pattern of three other blocks. A division mark located between the codewords of a codeword train can be abbreviated where a special condition exists between adjacent codewords. Further shortening can be obtained by coding wherein a prediction pattern is obtained and in which only a portion of a real pattern is different from the prediction pattern is encoded. As a result, the 2-valued image information is compressed and the 2-valued image information can be transmitted and processed with a higher efficiency.

16 Claims, 12 Drawing Sheets

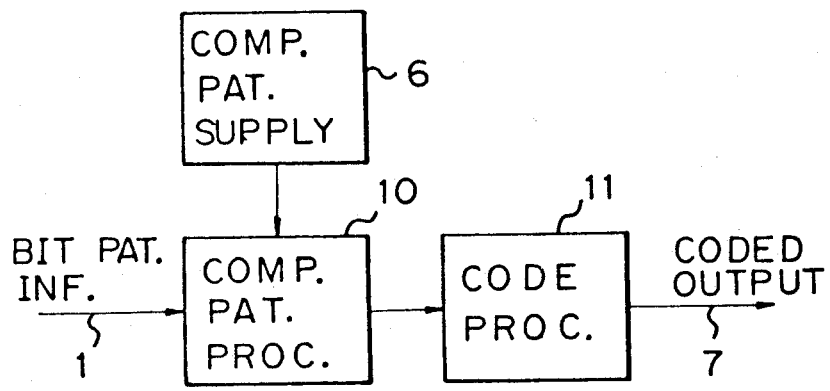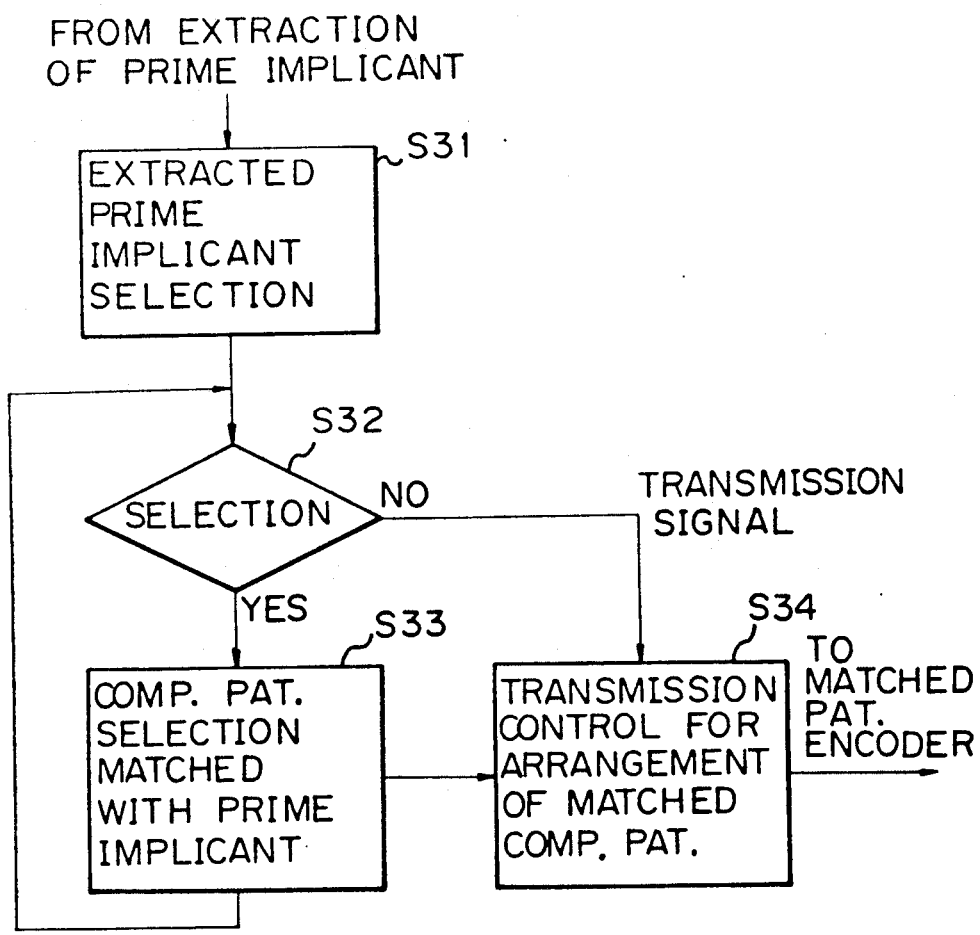

Fig. 7

| | | | | | | |
|---|---|---|---|---|---|---|
| (blank) | 1 | 1 | 1 1 | 1 1 | 1 1 | 1 1 1 1 |
| 237741 192593 | 272 1057 | 296 1263 | 554 2185 | 400 1476 | 408 1662 | 1255 4688 |

| | | | | | |
|---|---|---|---|---|---|
| 1 (top-left) / 1 (bottom-left) | 1 (bottom) | 1 1 | 1 1 | 1 1 | 1 1 1 1 |
| 354 1348 | 323 1222 | 624 2475 | 438 1768 | 465 1672 | 1435 4826 |

| | | | | | |
|---|---|---|---|---|---|
| 1 / 1 | 1 / 1 | 1 1 / 1 1 | 1 1 / 1 1 | 1 1 / 1 1 | 1 1 1 1 / 1 1 1 1 |
| 586 2287 | 598 2344 | 1154 4433 | 794 3306 | 780 3224 | 2201 7551 |

| | | | | | |
|---|---|---|---|---|---|
| 1 / 1 | 1 / 1 | 1 1 / 1 1 | 1 1 / 1 1 | 1 1 / 1 1 | 1 1 1 1 / 1 1 1 1 |
| 413 1587 | 425 1777 | 832 3617 | 675 2842 | 711 3037 | 2376 7911 |

| | | | | | |
|---|---|---|---|---|---|
| 1 / 1 | 1 / 1 | 1 1 / 1 1 | 1 1 / 1 1 | 1 1 / 1 1 | 1 1 1 1 / 1 1 1 1 |
| 457 1962 | 405 1783 | 826 3907 | 727 3375 | 618 3029 | 2053 8017 |

| | | | | | |
|---|---|---|---|---|---|
| 1/1/1/1 | 1/1/1/1 | 1 1 / 1 1 / 1 1 / 1 1 | 1 1 / 1 1 / 1 1 / 1 1 | 1 1 / 1 1 / 1 1 / 1 1 | 1 1 1 1 / 1 1 1 1 / 1 1 1 1 / 1 1 1 1 |
| 1311 4677 | 1358 4946 | 2322 8375 | 2336 8532 | 2352 8088 | 1893 2532 |

Fig. 15

|   X1 X2 | 00 | 01 | 11 | 10 | 00 | 01 | 11 | 10 |
|---|---|---|---|---|---|---|---|---|
| X3 X4 | | | | | | | | |
| 00 | A | | | | C | 1 | 1 | 1 |
| 01 | | | | | | 1 | 1 | 1 |
| 11 | | | | | | | 1 | 1 |
| 10 | | | | | | | 1 | 1 |
| 00 | B | | | | D | | | |
| 01 | | 1 | 1 | | | D' | | |
| 11 | | 1 | 1 | 1 | 1 | | | |
| 10 | | 1 | 1 | 1 | 1 | | | |

IMAGE INFORMATION CODE PROCESSING SYSTEM

BACKGROUND OF THE INVENTION

1) Field of the Invention

The present invention relates to an image information code processing system wherein bit pattern information expressing a 2-valued picture is compressed and coded for facsimile application and so on.

2) Description of the Related Art

As well known, one page of a document is sent under optical scanning by, e.g., 8 lines/mm and sampling intervals of 8 pixels/mm, to the scanning line in a facsimile. Therefore a large amount of digital image information included in a bit pattern obtained by the above scanning must be sent or stored.

Accordingly, various redundant compression coding systems have been developed; typical of which are those recommended as a facsimile coding standard by the CCITT (International Telegraph and Telephone Consultative Committee).

The recommendation shows an MH one dimensional coding system and an MR two dimensional sequential coding system.

In the MH system, a run-length coding for a bit pattern of 2-valued image information obtained along a scanning line compresses the information by conversion into a comparatively short codeword, combining continued bits having the same value.

In the MR system, a bit pattern along a scanning line is compared with a bit pattern along the adjacent next scanning line, and a difference bit pattern is obtained. The difference bit pattern is coded using the principle of the run-length coding, and by sequentially applying the same process, generally a higher information compression is obtained than with the MH system.

These compression coding systems can compress information to a certain degree as a general purpose system applied to various image information. However, these systems do not utilize a feature of the figure of the object image. If the features of the figure are considered, a higher compression of the information is possible. Thus, a coding system by which the above compression can be performed is desired.

SUMMARY OF THE INVENTION

An object of the present invention is to provide an image information code processing system wherein a compression rate in a coding process of a 2-valued image information can be decreased by using the geometrical features of the information.

In a first aspect of the present invention, there is provided an image information code processing system comprising component pattern supply means, component pattern processor means, and code processor means. The system receives bit pattern information as an input signal and outputs a coded output.

The component pattern supply means generates or stores a plurality of component patterns determined to constitute a bit pattern of each expanded block. The bit pattern of the 2-valued image information is divided into rectangular blocks having a predetermined dimension and rectangular expanded blocks comprising at least one of the rectangular blocks.

The component pattern processor means receives the bit pattern information, assuming that one of the blocks located at a predetermined position in the expanded block is an object block, and selects the component pattern so that a set of the component patterns belongs to a set of bits having a predetermined value (logical "1" (black) or "0" (white)) in the bit pattern of the expanded block and a set of bits not expressed by the codeword determined for other blocks in the bit pattern of the object block belongs to the set of the component patterns.

The code processor means receives a codeword train comprising predetermined codewords for identifying the selected component patterns and encodes the bit pattern of the object block.

In a second aspect of the present invention, there is provided an image information codeword processor system further comprising division mark processor means in addition to the elements of the first aspect of the invention.

The code processor means arranges predetermined codewords in a predetermined order, these codewords identify the component patterns expressing a bit pattern, and inserts a predetermined division mark between adjacent codewords.

The division mark processor means detects whether a head mark of the codeword satisfies predetermined conditions for the preceding arranged codeword, and if so suppresses an insertion of the division mark between the codewords.

In a third aspect of the present invention, there is provided an image information code processor system comprising prediction pattern supply means and code forming means having prediction processor means, component pattern supply means, component pattern processor means, and code processor means. The system receives bit pattern information, determines a predetermined codeword expressing the bit pattern of a rectangular block having a predetermined dimension to which 2-valued image information expressed by the bit pattern is divided, and outputs the coded outputs.

The prediction pattern supply means generates a prediction pattern from the bit patterns of at least one block.

The code forming means forms an object block codeword using a predetermined mark indicating a coincidence between a bit pattern of the object block and a prediction pattern determined by the bit patterns of blocks in contact with the object block at predetermined sides, or in the case of a non-coincidence, using the necessary predetermined codeword expressing a predetermined bit pattern.

BRIEF DESCRIPTION OF THE DRAWINGS

FIG. 1 is a block diagram showing a constitution of a first embodiment of the present invention;

FIG. 3 is a flow chart of processing steps in a component pattern processor in FIG. 2;

FIG. 7 is a diagram showing examples of the prime implicants in the embodiments;

FIGS. 11A and 11B are diagrams showing a second example of a division mark abbreviation in the embodiment in FIG. 9;

FIG. 15 is a diagram explaining a pattern prediction process.

DESCRIPTION OF THE PREFERRED EMBODIMENTS

Figure 2:
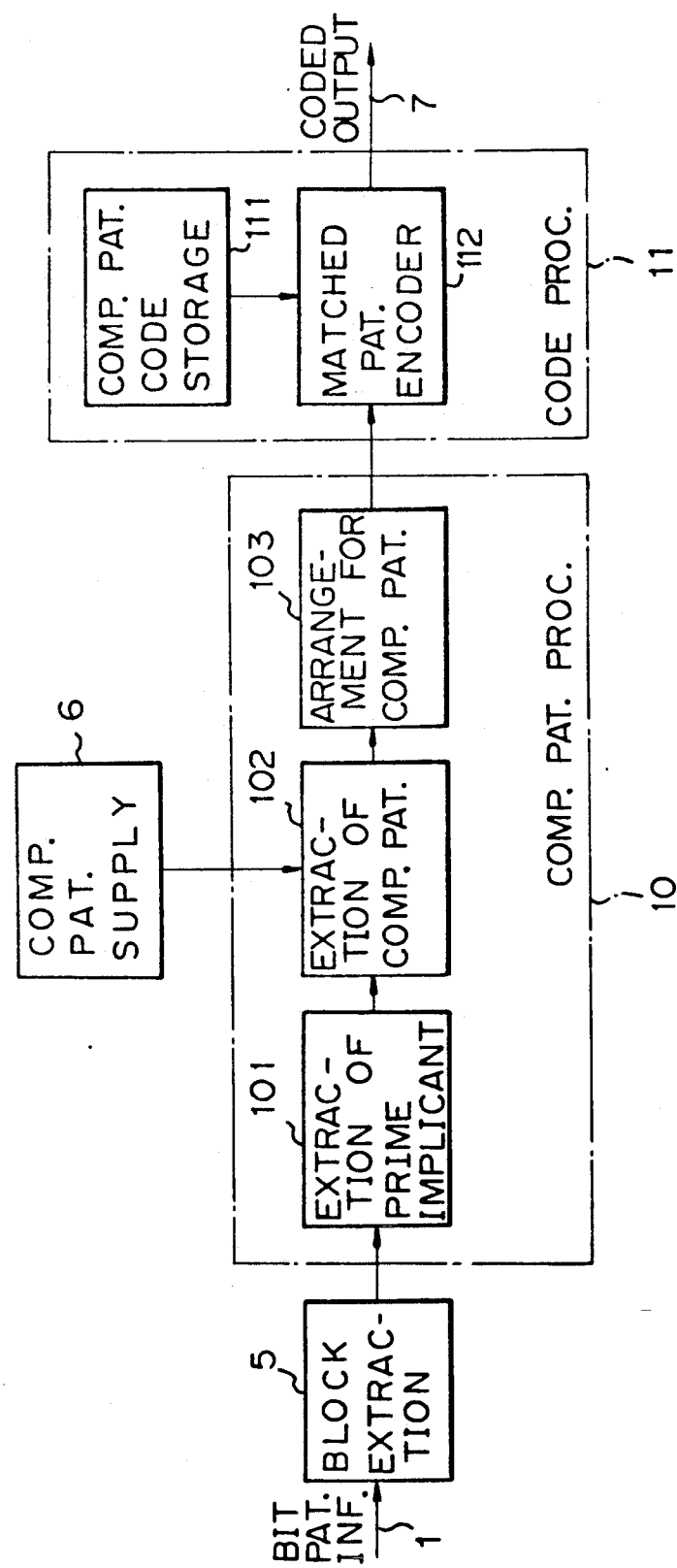
FIG. 2 is a detailed block diagram showing the embodiment in FIG. 1.

Embodiments of the present invention are explained below. FIG. 1 shows a block diagram of a first embodiment, and FIG. 2 is a detailed view of FIG. 1.

In FIG. 1, a system of the first embodiment is illustrated as including a component pattern processor (COMP. PAT. PROC.) 10, a component pattern supply section (COMP. PAT. SUPPLY) 6, and a code processor (CODE PROC.) 11. A bit pattern information (BIT PAT. INF.) 1 is applied to the component pattern processor 10 as an input signal. An output of the code processor 11 is a coded output 7. The component pattern processor 10 is supplied with component patterns necessary for constituting a bit pattern from the component pattern supply section 6 and determining a matched codeword for the component pattern. The code processor 11 combines a codeword for a bit pattern of a block included in a 2-valued image information.

The bit pattern information 1 is a 2-valued image information to be processed. In order to encode the bit pattern information 1, the 2-valued image is divided into rectangular blocks or square blocks having a predetermined dimension and rectangular expanded blocks containing a predetermined number of rectangular or square blocks. The component pattern supply section 6 stores or generates a plurality of component patterns necessary for constituting the bit pattern of each of the expanded blocks. Each component pattern is made to express the requested bit pattern only by itself or by more than two logical summations, and is given a matched codeword for distinction.

The component pattern processor 10 receives expanded block information in the bit pattern information 1, and a block of the blocks included within the expanded block which is located at a predetermined position is determined as an object block. The object block is processed as follows.

That is, the bit pattern of the expanded block is collated with the component pattern in the component pattern supply section 6, a set of the component patterns belonging to, for example, the set of "1" bits in the object bit pattern is obtained, and then the component patterns necessary for completing the bit pattern of the object block are selected. Since a portion of the bit pattern of each object block is generally included in the component pattern already selected in other expanded blocks, it is not necessary for the selected component pattern in this process to completely cover the set of the bits.

The code processor 11 receives a matched codeword of each component pattern which is selected in the above process, and then a codeword train which is an arrangement of one or a plurality of matched codewords is constituted as a codeword of the current object block. Then, the code processor 11 generates a coded output, in which the borders of the codeword are shown by division marks.

The formation of a component pattern is now explained.

FORMATION OF COMPONENT PATTERN

In FIG. 1, the bit pattern information 1 is a 2-valued image information for an object signal to be processed. For example, the bit pattern information is utilized in a facsimile apparatus.

When the 2-valued image comprising the bit patterns for characters and pictures is divided into, e.g., $4 \times 4$ bit square blocks, the types of stroke appearing in the block are generally limited to a small number. Accordingly, the bit pattern is divided into as few component strokes as possible, the number of necessary component stroke types for constituting all the patterns is determined to be as low as possible. If the codeword which expresses the bit pattern of each block by a matched codeword for the component stroke is obtained, compression of an image information can be carried out.

However, noise type information exists in the bit pattern information after immediate pick up from an original image, and thus such bit patterns are preferably eliminated. Also, to further strengthen the compression effect, preferably a preprocessing for simplifying the bit pattern appearing in the above-mentioned blocks is carried out, so that the image reproduced from the bit pattern is not degraded.

In this preprocessing, for example, if each pixel bit in the bit pattern of a monochromatic 2-valued image satisfies neither of the following conditions (1) and (2), the bit is an illegal pixel, and the illegal bit or a bit near the illegal bit is inverted to eliminate the illegal bit.

Condition (1):

Three adjacent bits having the same color (white or black) as an object bit exist in the upper, lower, left, or right directions of the object bit.

Condition (2):

Two bits which are the same color as the object bit and are adjacent in the upper, lower, left, or right directions, are diagonally adjacent to each other.

Figure 5A:
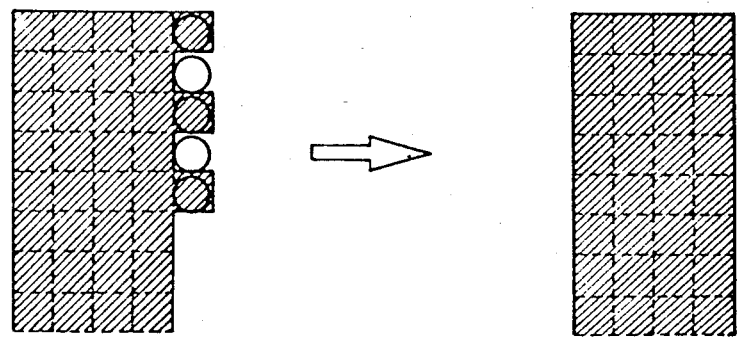
FIGS. 5A, 5B, and 5C are diagrams explaining a preprocessing operation in the embodiments.
Figure 5B:
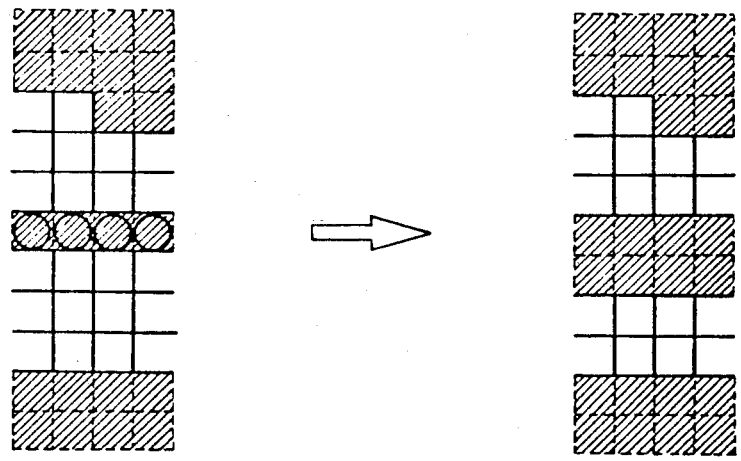
Figure 5C:
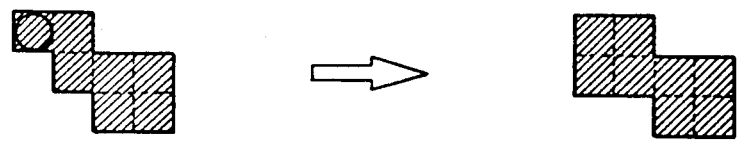

In FIGS. 5A, 5B, and 5C, examples of the illegal bits are shown by a circle at the left side of the figure. The illegal bits are processed as at the right side of the figures. In FIG. 5A, the border line between white and black is smoothed out, and in FIG. 5B, a fine line is emphasized. The illegal bit remaining after the process, is processed to simplify the image, for example, as shown in FIG. 5C.

In this embodiment, a system for expression of a prime implicant is utilized to encode the above preprocessed bit pattern information. This system is a preferred means for obtaining an appropriate component pattern. Using this system, a $4 \times 4$ bit block pattern is expressed by the above-mentioned component pattern set.

In this system, the above-mentioned block is made to correspond to Karnaugh's map, well known in switching circuit theory (McCluskey, E.J.: Introduction to the Theory of Switching Circuits, McGraw Hill (1965)), and the values ("0" and "1") expressing white and black shades in a bit pattern are allotted to a block of the Karnaugh map, and then the black pattern expressed by "1" can be thought of as a set of points satisfying a logical equation.

Figures 6A, 6B:
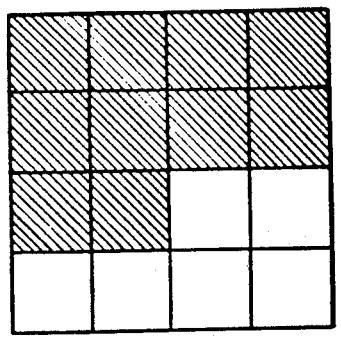
FIGS. 6A and 6B are diagrams showing a process for obtaining a prime implicant in the embodiments.

That is, as shown above, if blocks are $4 \times 4$ bits, the Karnaugh map is a diagram for showing a state of a logical equation consisting of four logical variables $X_1$, $X_2$, $X_3$, and $X_4$, as shown in FIG. 6B. Sixteen blocks correspond to combinations having a particular value of logical variables which are indicated at the upper side and left side.

For example, in the case of the pattern shown in FIG. 6A, logical values are allotted as in FIG. 6B. A set consisting of the minimum prime implicant which can express the logical equation by a known sequence using the above Karnaugh map in FIG. 6B, utilizing a simplified logical equation, is obtained. If there are a plurality of sets of prime implicants, the set having a minimum number of variables is selected, so that one prime implicant can cover as wide an area of the pattern as possible.

Thus, in the example of the Karnaugh map of FIG. 6B, a logical equation $f = X_2\bar{X}_3 + X_1$ constituted of a prime implicant $X_2\bar{X}_3$ and a prime implicant $X_1$ is defined.

The above processing is performed for the bit pattern appearing in the blocks, then, all the prime implicants necessary for expressing the block patterns are obtained.

In order to obtain a component pattern, the following consideration must be made. For a black picture and white background, for example, the prime implicant $\bar{X}_2$ expressing a black pattern of each of the columns at the left and right edges is excluded, since the appearances thereof are few. That is, the $\bar{X}_2$ is expressed by $\bar{X}_1X_2 + X_1\bar{X}_2$. Also, all white blocks are added as a prime implicant.

The prime implicants obtained by the above process, for example, are expressed as 37 examples by the Karnaugh map notation as shown in FIG. 7. Where, the figures under each prime implicant are the frequencies of appearance of bit patterns obtained from two test charts for facsimile as defined in CCITT, as a reference. The upper figures show one test chart and lower figures show the other test chart.

The component pattern supply section 6 stores the bit patterns corresponding to each of the above prime implicants as component patterns. Each component pattern is given a matched codeword which is, for example, a number, to distinguish the component pattern.

Therefore, the component pattern stored in the component pattern supply section 6 expresses a bit pattern appearing in a block by one or two logical summation(s), as clear in correspondence to the Karnaugh map.

The component pattern supply section 6 may be formed to generate the above-mentioned necessary component patterns corresponding to the bit patterns in response to the request from the component pattern processor 10.

BLOCK CODING

As illustrated in FIG. 2, the component pattern processor 10 comprises an extraction of prime implicant section 101, an extraction of component patterns section 102, and an arrangement for component patterns section. The component pattern procesor 10 receives receives information corresponding to one block as bit pattern information 1 from a block extraction section 5; compares the information with the component patterns; and selects the set of the minimum number of a component pattern or component patterns identical with the set of bits of the block, by selection from, e.g., as small a number of component patterns belonging to black bit set as possible.

The code processor 11 comprises a component pattern code storage section 111 and a matched pattern encoder 112. The code processor 11 and arranges matched codewords in an appropriate order after receiving the matched codewords of the component patterns selected in each block by the component pattern processor 10. Then, the code processor 11 determines the codeword to be an expression codeword for the block and inserts a predetermined mark which can be distinguished from the matched codeword as a division mark, i.e., segmentation codeword, between the matched codewords.

The division mark is generally necessary because the bit length of the codeword is variable, however, as mentioned later, an abbreviation of the division mark is possible between the codewords having special relationships so that the coded output can be further shortened.

FIG. 3 shows the process steps of the component pattern processor 10 in FIG. 2. In step 31 (S31), after extraction of the prime implicant, one extracted prime implicant is selected. In step 32 (S32), if a selection is not made, the process proceeds to step 34 (S34). When a selection is made, the process proceeds to step 33 (S33). In step 33, it is determined whether the component pattern is a match or mismatch with the prime implicant. If the selected pattern matches the prime implicant, the process proceeds to step 34 and if not, the process returns to step 32. In step 34, the matched component pattern is arranged and output to a matched pattern encoder 112.

EXPANDED BLOCK CODING

In the above-described block coding, the coding is performed for each $4 \times 4$ bit block. By the expansion as mentioned below, for example, an expanded block coding comprising 4 blocks of square domain can obtain a higher coding compression. The block coding is a special example in which the expanded block coding is degenerated to one block and the process thereof simplified.

In the expanded block coding, for example, a block is $4 \times 4$ bits. An expanded block is defined to have 4 adjacent blocks; upper and lower left and upper and lower right. When a block is coded, for example, the block (hereinafter called the object block) located at the upper left position (block A in FIG. 8), the following processes are carried out.

For these processes, the component patterns for the expanded block are formed and prepared. In this example, instead of the above four variables of $X_1$ to $X_4$, an $8 \times 8$ Karnaugh map having 6 variables of $X_1$ to $X_6$ is used as illustrated in FIG. 8 and in the map, the bit pattern is applied and a prime implicant obtained.

Here, in the thus obtained prime implicants, only the prime implicants which cover the patterns of the object blocks are expanded prime implicants. The component pattern is constituted by the expanded prime implicants.

Figure 8:
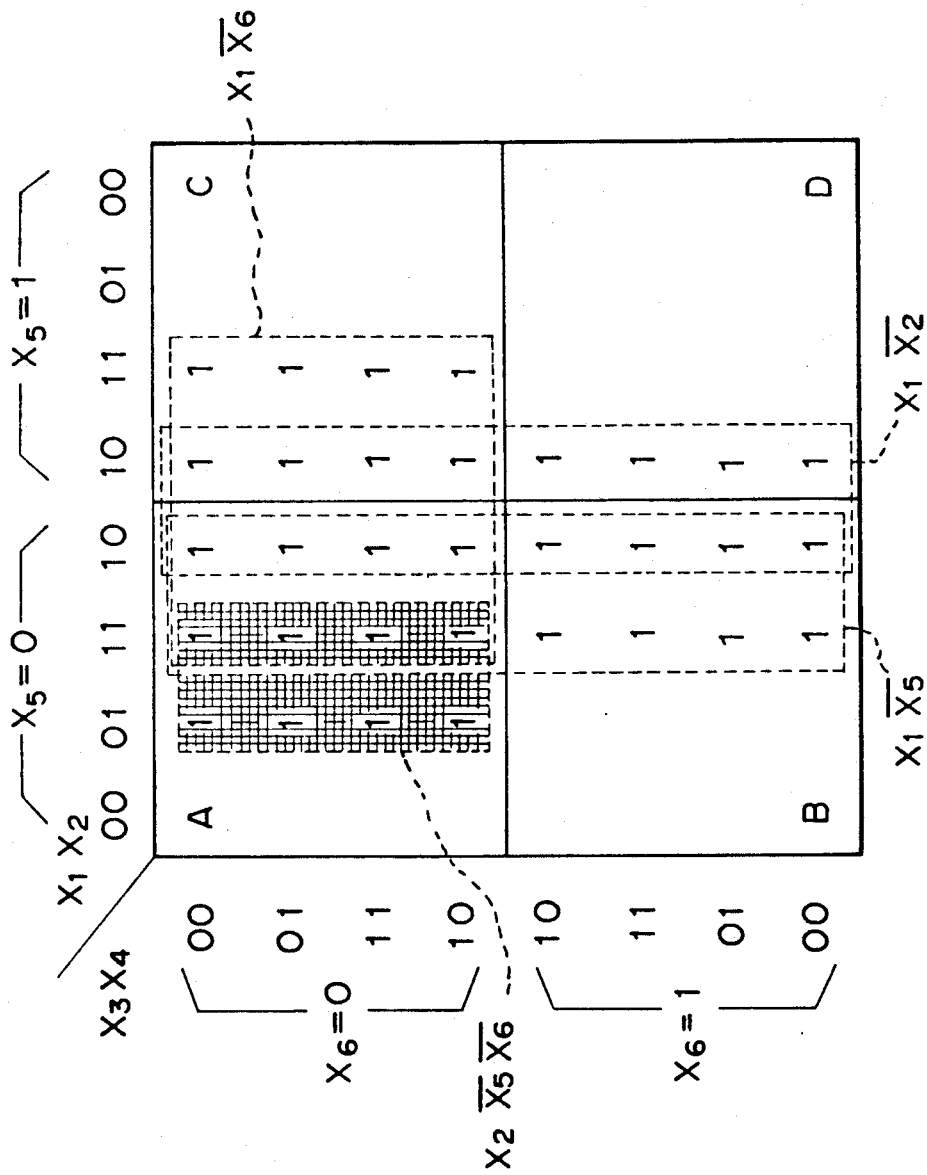
FIG. 8 is a diagram explaining an expanded block in the embodiments.

In the example of FIG. 8, the block A is the object block, blocks A, B, C, and D constitute an expanded block and $X_2\bar{X}_5\bar{X}_6$, $X_1\bar{X}_6$, $X_1\bar{X}_5$, and $X_1X_2$, which are encompassed by broken lines, are the expanded prime implicants.

The component pattern corresponding to the expanded prime implicant obtained in this manner is formed and stored in the component pattern supply section 6 and given a matched codeword.

The component pattern processor 10 receives an expanded block of information wherein the block to be processed is the object block, to sequentially process each the remaining blocks of the bit pattern information 1 are then sequentially processed. The expanded block information is compared with the component patterns from the component pattern supply section 6, and a set of the minimum number of component patterns is selected, which set is a set of component patterns belonging to a set of black bits and is necessary to complete the bit pattern of the object block.

Where, the adjacent blocks of the expanded block are processed in order from left to right and from upper to lower as an object block, except for an upper left block, each block is processed at least once as a member other than the object block of the expanded block until each block is processed as an object block. Generally in each block, bits included in the component pattern determining another block as an object block are included as a part thereof.

Therefore, the component pattern processor 10 memorizes the above-mentioned processed bits for each block of the expanded block. When the block is included again in the expanded block to be processed, it is not necessary to cover the already processed bits by the selected component pattern, that is, the bits are "don't care" bits in the switching circuit theory.

The component pattern processor 10 selects the component pattern, the set of which belongs to the set of black bits of the expanded block. At that time, the set of the above-mentioned processed bits may or may not belong to the set of black bits.

For the object block, the minimum component pattern set is selected from the set of the component patterns so that the set of the not processed bits in the set of the black bits belongs to the set of the component pattern.

In the example of FIG. 8, if $X_2$ of the object block A (indicated by shading in FIG. 8), is already in the set of processed bits, $X_1\overline{X}_6$, $X_1\overline{X}_5$, and $X_1\overline{X}_2$ may be the component pattern. If in blocks B, C, and D, the processed bits are not included, the component pattern corresponding to $X_1\overline{X}_2$ is selected so that the most not processed black bits are covered.

The code processor 11 receives the matched codewords of component patterns which are selected by the component pattern processor 10, as mentioned above, in each object block and sequentially generates a coded output 7 as in the case of the block coding.

Figure 4:
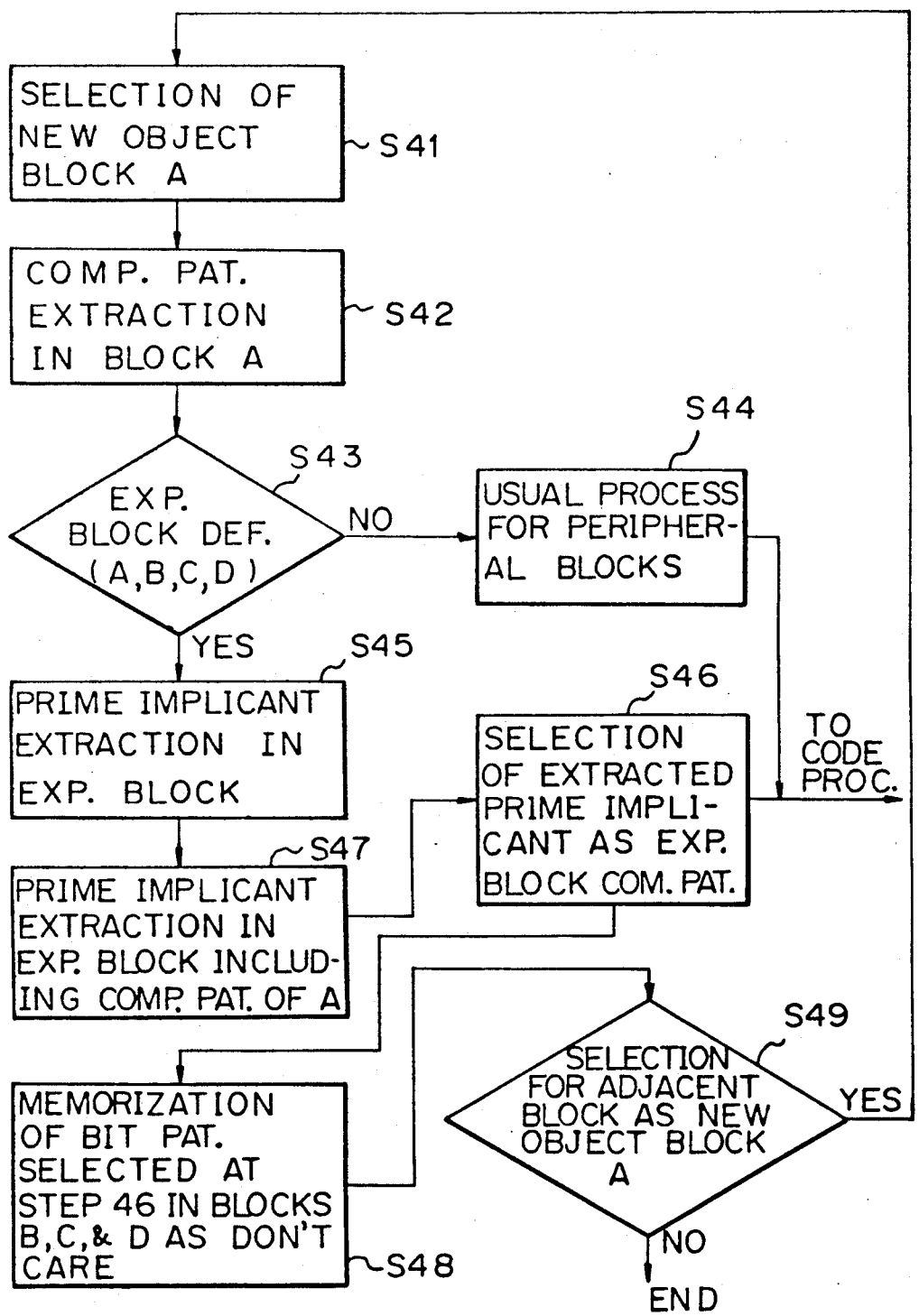
FIG. 4 is a flow chart for forming an expanded block for the embodiment in FIG. 2.

FIG. 4 shows process steps using the expanded block. In step 41 (S41), a new object block A is selected. In step 42 (S42), the component pattern is extracted in block A, and in step 43 (S43), an expanded block definition (EXP. BLOCK DEF.) is performed. If definition is possible, the process proceeds to step 45 (S45). If definition is not possible, the process proceeds to step 44 (S44). In step 45, the prime implicant is extracted, and in a step 47 (S47), the prime implicant in the expanded block including a component pattern of block A is extracted. After step 47, the process proceeds to step 46 (S46). In step 44, the usual process is performed as for peripheral blocks. In step 46, the extracted prime implicant is selected as an expanded block component pattern. After steps 44 and 46, the process moves to the code processor 11. After step 46, in addition, in step 48 (S48), the bit pattern selected in step 46 in the blocks B, C, and D, is marked as "don't care". In step 49 (S49), the adjacent block is selected as a new object block A. If selection is possible, the process returns to step 41, and if selection is not possible, the process ends.

Figure 9:
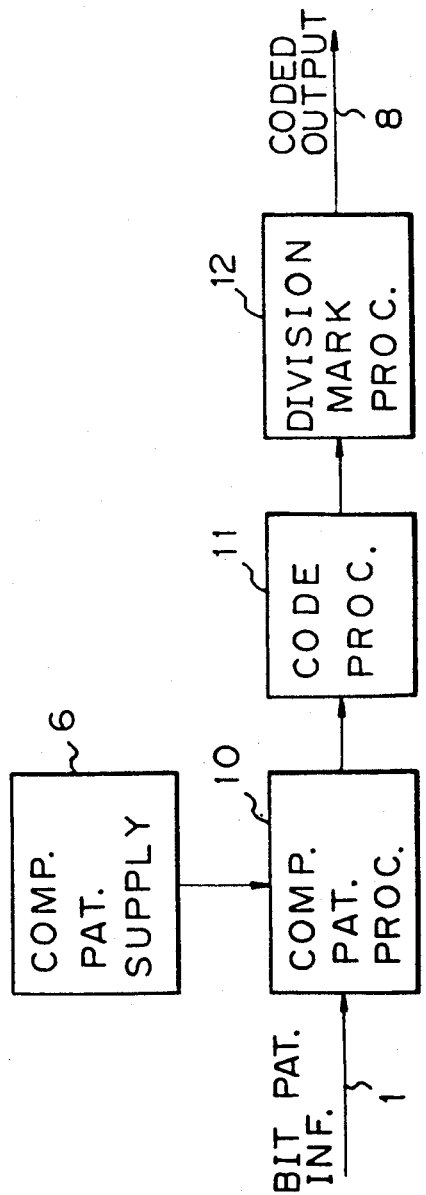
FIG. 9 is a block diagram showing a constitution of a second embodiment of the present invention.

A second embodiment of the invention is explained below with reference to FIG. 9. This embodiment is provided with a division mark processor 12 in addition to components described in the first embodiment. The division mark processor 12 receives an output of the code processor 11 and suppresses a division mark output between the codewords which satisfies predetermined conditions.

In this embodiment, the condition in which the head mark of a codeword is not included in a preceding codewords, is adopted. The division mark processor 12 examines the relationship between each codeword and the next head mark, and if the condition is satisfied, the insertion of the division mark at a point preceding the codeword is suppressed. Thus the coded output 8 can be shortened. The division mark abbreviation process is now explained.

DIVISION MARK ABBREVIATION PROCESS

As in the preceding description, generally a predetermined division mark must be inserted between codewords of the coded output 7 to show a border of codewords. The division mark processor 12 in FIG. 9 compares a codeword on the coded output and the following head mark of the next codeword (component pattern matched codeword). If the head mark is not included in the preceding codeword, the division mark which should be located before the head mark can be omitted and thus a shorter coded output 8 is obtained.

In the apparatus utilizing the coded output 8, the signal of the coded output 8 is taken out from the head, and if the next signal of the codeword train followed by the codeword determined hereinafter or the division mark is a division mark or a codeword satisfying the preceding conditions, the codeword train is considered as one code.

In a first example of the above conditions, the matched codeword of the component patterns are added in a predetermined order. The code processor 11 arranges the matched codewords of the selected component pattern in one block to a codeword train, in the predetermined order.

The division mark processor 12 compares the last mark of a codeword and the head mark of the next codeword, when the two marks are only in the predetermined order, the division mark is left as it is, and when the two marks are the same or not in the predetermined order, the division mark is eliminated.

In a second example of the above conditions, when it is assumed that component patterns corresponding to each prime implicant constituting the preceding logical equations are provided, the division mark processor 12 detects whether the component pattern distinguished by the head mark of the codeword belongs to the set of the component pattern distinguished by the mark of the preceding codeword (i.e., included completely in the bit pattern of the set), or conversely, the former belongs to the latter, and under such conditions, the division mark is eliminated.

This condition is satisfied in the following state, wherein, for example, as shown in FIGS. 11A and 11B, the matched codeword is expressed by $P_i$, the component pattern of the left block in FIG. 11A is expressed by $P_1 + P_2$, and the head component pattern included in the following right block is expressed as $P_3$.

That is, in this example, if $P_3$ is $P_1 + P_2 + P_3$ and $P_3$ is included in the left block codeword, the bit pattern expressed thereby, as shown in FIG. 11B, the bit pattern is identical with $P_3$, and the above state does not comply with the definition that the bit pattern expression corresponds to the logical equation comprising prime implicants. Therefore, $P_3$ is not included in the preceding codeword, at that time if the division mark is abbreviated, the border of the codeword can be distinguished.

Figure 12B:
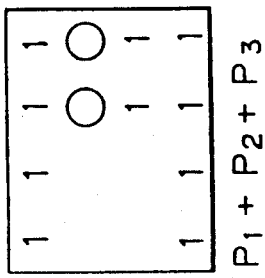
FIGS. 12A and 12B are diagrams showing a third example of the division mark abbreviation in the embodiment in FIG. 9.
Figure 12A:
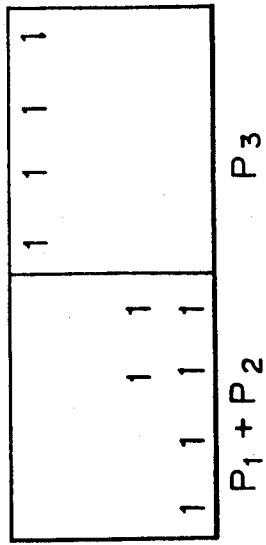

In the example of the third condition, assuming that the bit pattern information 1 is completely preprocessed as mentioned above, the division mark processor 12 temporarily makes a bit pattern combining component patterns distinguished by the head mark of the codeword and the preceding codeword mark. If the temporarily made bit pattern includes the bit pattern which is eliminated by the preprocessing, the division mark is abbreviated.

Where the condition as shown in FIGS. 12A and 12B is satisfied the pattern of the left block in FIG. 12A is expressed by $P_1 + P_2$, and the component pattern of the head of the following right block is expressed as $P_3$.

That is, if the above $P_3$ is combined with $P_1 + P_2$ the combined bit pattern is as shown in FIG. 12B. The bits enclosed by a circle in FIG. 12B are illegal bits. This state shows that the preprocessing is not complete and does not comply with the assumption. Therefore, in this case, the division mark is abbreviated.

The division mark processor 12 carries out the abbreviation of the division mark by applying one or a combination of two or more conditions.

Figure 10:
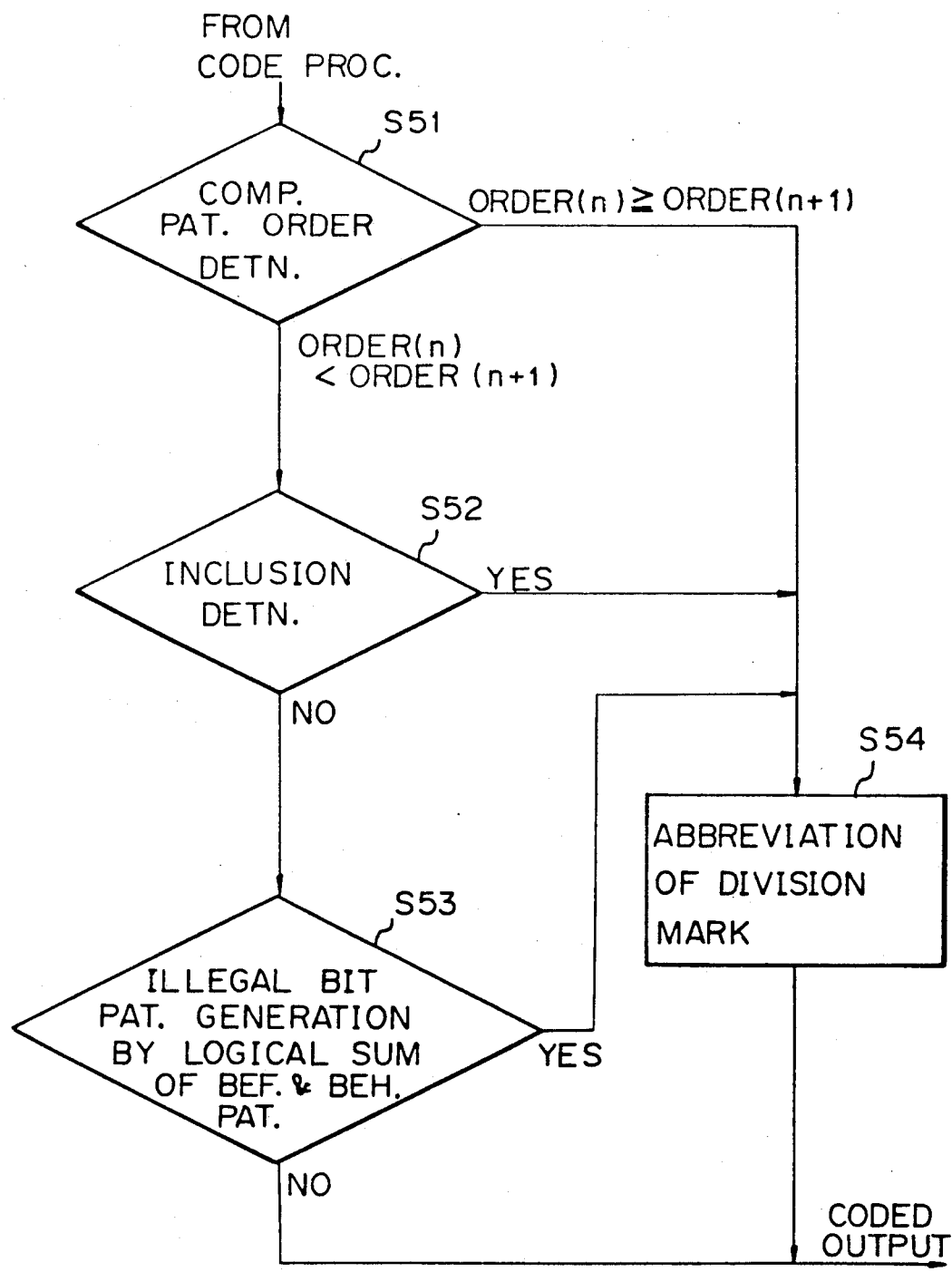
FIG. 10 is a diagram showing a flow chart of the division mark processor for the embodiment in FIG. 9.

In FIG. 10, a flow chart in the division mark processor 12 in the second embodiment is shown. In step 51 (S51), the signal from the code processor determines the order of the component patterns. If the order of the preceding component pattern is higher than or equal to the order of the next component pattern, the process proceeds to step 54 (S54). If the order of the component pattern is lower than the order of the next component pattern, the process proceeds to step 52 (S52). In step 52, inclusion between the component patterns is determined. If one is included in the other, the process proceeds to step 54. If not, the process proceeds to step 53 (S53). In step 53, by the logical sum of the preceding (or before) and the next (or behind) patterns, the generation of the illegal bit pattern is detected. If the generation occurs, the process proceeds to step 54. If the generation does not occur, the process ends and the system outputs the coded output. In step 54, the abbreviation of the division mark is processed, and the process after step 54 is the same as that of step 53.

Figure 13:
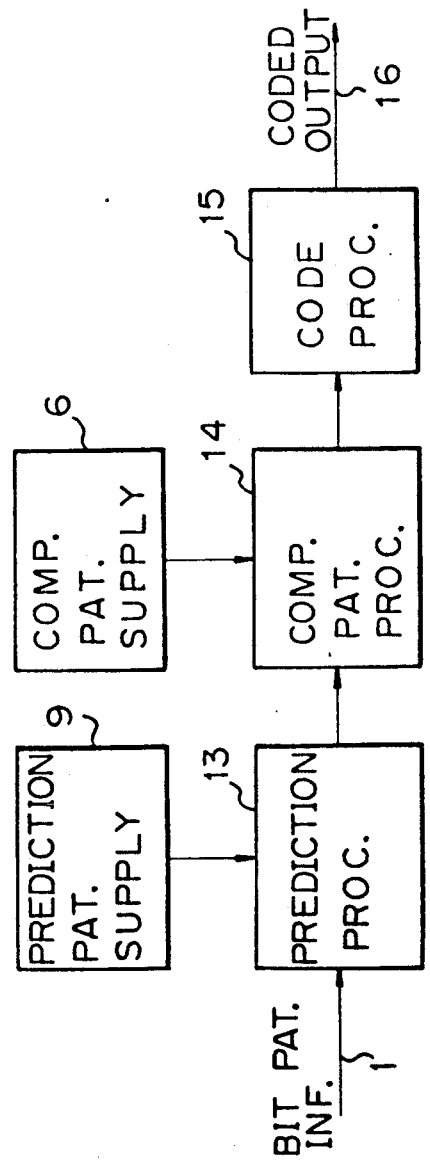
FIG. 13 is a block diagram showing a constitution of a third embodiment of the present invention.

A third embodiment of the present invention is explained below. In FIG. 13, reference numeral 13 denotes a prediction processor which supplies a coincidence state, etc., between a prediction pattern from a prediction pattern supply section 9 and the bit pattern information, to a component pattern processor 14, and 15 is a code processor generating a coded output 16 from the coincidence state mark supplied from the component pattern processor 14 and the matched codeword of the component pattern.

The prediction pattern supply section 9 generates a prediction pattern to predict a bit pattern of a block after processed from a bit pattern of the block located at a predetermined related position, for a sequentially processed block.

The prediction processor 13, for each object block, compares the bit pattern of the block with prediction pattern taken out from the prediction pattern supply section 9 based on the bit pattern of the block having a predetermined adjacent relationship, and forms a predetermined mark showing a coincidence state of both patterns and a necessary bit pattern in each state other than the coincidence state. The formed patterns are supplied to the component pattern processor 14.

The component pattern processor 14 encodes the supplied bit pattern with reference to the component pattern supply section 6 only when the state is not the coincidence state, and supplies the codeword of the selected component pattern and the mark of the coincidence state to the code processor 15. The code processor 15 outputs the coded output 16.

A pattern prediction used in this embodiment is now explained.

PATTERN PREDICTION

In the above block coding system and the expanded block coding system, a bit pattern of the following block is predicted from the already defined block, when the prediction and the following bit pattern coincide, only a "success" of the coincidence with the prediction is expressed, and the coding which expresses the real bit pattern directly is abbreviated, thus the coded output is shortened.

In addition, where the prediction pattern belongs to the real bit pattern, the expression "partial success" is made, and a codeword expressing the bits not within the prediction pattern is added to the expression. Thus, a further information compression can be expected.

In a case other than "success" and "partial success", "failure" is expressed and the whole bit pattern is coded as described above.

The prediction processor 13 in FIG. 13 applies the above prediction to, e.g., the bit pattern of the block supplied from the bit pattern information 1, and the results are sent to the component pattern processor 14. The prediction pattern supply section 9 stores or calculates a prediction pattern from the bit pattern which is the base of the prediction pattern to be predicted, and supplies the same to the prediction processor 13.

As shown in an example of FIG. 15, the bit pattern of block D is predicted by the bit patterns of columns of block C and rows of block B in contact with the upper and left side of block D. The prediction pattern is formed by a logical summation of two bit patterns so that the upper column bit pattern and the left row bit pattern move to all the columns and rows of block D as is.

Namely, when the bit pattern corresponds to the 4×4 Karnaugh map, the prediction pattern is expressed by the logical summation of each logical equation in only the portions expressing the characters $X_3$ and $X_4$ in the logical equation expressing the fourth row pattern of block B and characters $X_1$ and $X_2$ in the logical equation expressing the fourth column pattern of block C.

The prediction processor 13, for the object block D, supplies a bit pattern of the fourth row in block B adjacent to the left of and the fourth column in block C adjacent above the prediction pattern portion 9. Then, the prediction processor 13 receives a prediction pattern D' and compares the same with the real bit pattern of block D.

As a result, if both patterns coincide, a predetermined mark "success", which expresses a successful coincidence, is supplied to the component pattern processor 14. The component pattern processor 14, in this case, for example, outputs the "success" mark to the code processor 15 as is, and the process of the block is then ended. The code processor 15 determines the "success" mark as a codeword of the block and outputs a coded output 16.

If a portion of the pattern of the block D coincides with a prediction pattern D', that is, in the case that, in the example of FIG. 15, the prediction pattern is all black in the D' portion and the other is all white, while in the real pattern D' is black and D" in FIG. 15 is partially black, i.e., a partial coincidence is achieved; the prediction processor 13 removes the portion which coincides with the prediction pattern, makes a partial pattern which is D" pattern, and supplies the partial pattern and the predetermined "partial success" mark to the component pattern processor 14.

The component pattern processor 14 selects a set of the component pattern constituting the supplied partial pattern from the component pattern supply section 6 and supplies the set together with a "partial success" mark to the code processor 15. Therefore, the code processor 15, for example, pre-locates the "partial success" mark to the codeword train of the matched codeword of the component pattern.

If the prediction pattern and the pattern of block D are not in one of the above two states, the prediction processor 13 supplies a predetermined "failure" mark and the bit pattern of the block D to the component pattern processor 14. The component pattern processor 14 selects a set of the component pattern constituting the supplied bit pattern from the component pattern supply section 6, and supplies the set together with a "failure" mark to the code processor 15. The code processor 15 pre-locates the "failure" mark to the codeword train of the matched codeword of the component pattern.

In this system, by using appropriate marks such as "success", "partial success", and "failure", these marks can function as the division mark and can abbreviate the division mark of the coded output 16.

Figure 14:
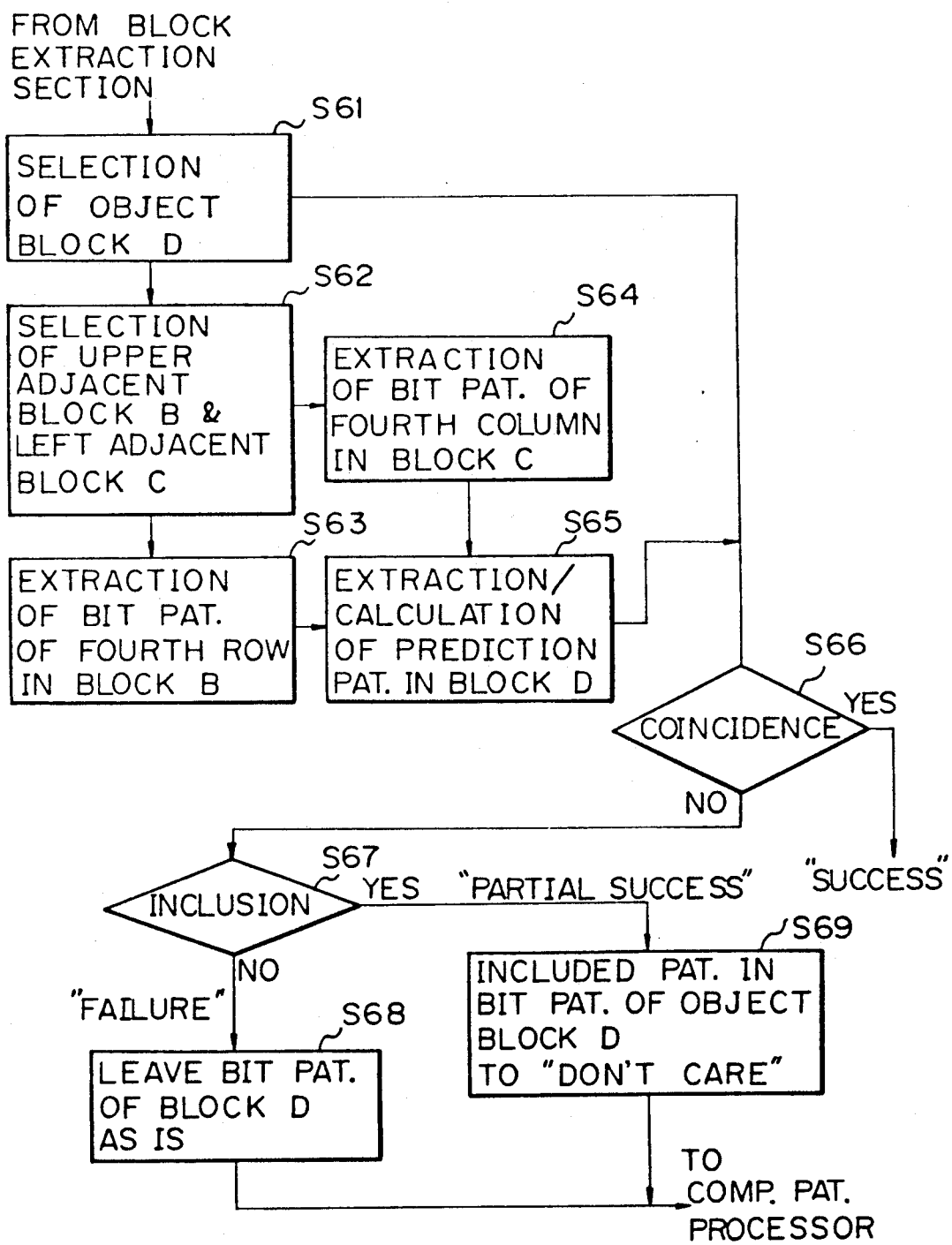
FIG. 14 is a diagram showing a flow chart of process steps of the embodiment in FIG. 13.

FIG. 14 shows a flow chart of the prediction process. At first, in step 61 (S61), an object block D is selected, and in step 62 (S62), the upper adjacent block B and the left adjacent block C are selected. Then, in step 63 (S63), the bit pattern of the fourth row in the block B is extracted. On the other hand, after step 62, the process also proceeds to step 64 (S64). In step 64, the bit pattern of the fourth column in the block C is extracted. After steps 63 and 64, the process proceeds to step 65 (S65). In step 65, the prediction pattern in the block D is calculated. The patterns from steps 61 and 65 are compared in step 66 (S66). If the coincidence of the two patterns is obtained, the process is handled as a "success". If the coincidence cannot be obtained, the process proceeds to step 67 (S67). In step 67, inclusion between the two patterns is determined. If one pattern is included in the other, the process is handled as a "partial success". If one pattern is not included in the other, the process is handled as a "failure" and proceeds to step 68 (S68). In step 68, the bit pattern of the block D is left as is and the process proceeds to the component pattern processor 14. When the process is a "partial success", after step 67, the included pattern in the bit pattern of the object block D is made to the "don't care" state in step 69 (S69). After step 69, the process proceeds to the component pattern processor 14.

As clear from the discussion above, this invention can be applied to an image information code processing system such that 2-valued image information can be compressed and encoded with a higher code compression rate.

We claim:

1. An image information code processing system for receiving bit pattern information including 2-valued image information and for encoding the 2-valued image information, the 2-valued image information including a plurality of expanded blocks each comprising a predetermined number of unit blocks with predetermined dimensions, each of the expanded blocks having a bit pattern, said system comprising:

component pattern supply means for supplying a plurality of component patterns constituting the bit pattern of each of the expanded blocks;

component pattern processor means for selecting the component patterns, one of the unit blocks located at a predetermined position in the expanded block being an object block, a set of the component patterns having a set of bits with a predetermined value in the bit pattern of the expanded block, and the selecting is performed based on a set of bits not expressed by the component patterns already selected for other unit blocks in the bit pattern of the object block belonging to the set of the component patterns, and for outputting matched codewords corresponding to the component patterns selected;

code processing means for encoding the 2-valued image information corresponding to the object block with a codeword train comprising the matched codewords from said component pattern processor means; and wherein said component pattern processor means selects component patterns determined to correspond to prime implicants in response to a set of bits including bits having a predetermined value in the bit pattern of the object block, the prime implicants being such that when each bit the bit pattern of the expanded block corresponds to a different combination with each bit being a predetermined logical variable value, a set of bits corresponding to a combination of the predetermined logic variable value making a predetermined logical equation including prime implicants true coincides with the set of bits having the predetermined value of the bit pattern of the expanded block.

2. An image information code processing system as set forth in claim 1, wherein the bit pattern includes bits corresponding to pixels, each bit having a color, and the predetermined conditions include first and second conditions, and wherein the preprocessing identifies and eliminates bits corresponding to pixels deemed illegal in dependence upon one of the first and second conditions, the first condition compares the color of one of the bits with the color of three of the bits adjacent thereto, the second condition compares the color of one of the bits with the color of two of the bits diagonally adjacent thereto.

3. An image information code processing system for encoding 2-valued image data expressed as an input bit pattern, comprising:

component pattern supply means for generating a plurality of component patterns constituting a bit pattern of unit blocks having a predetermined dimension, the unit blocks are divisions of the 2-valued image data;

component pattern processor means for selecting the component patterns identified by matched codewords having head marks so that a set of component patterns expresses the bit pattern of one of the unit blocks and for outputting matched codewords corresponding to the component patterns selected;

code processor means for expressing the 2-valued image as an arrangement of the matched codewords of the component patterns selected, for expressing the matched codewords in a predetermined order, and for providing an insertion of predetermined division marks between the matched codewords adjacent to one another; and division mark processor means for suppressing the insertion of the division marks between the matched codewords, when the head mark of the matched codeword satisfy a predetermined condition based on a preceding matched codeword in the predetermined order of the matched codewords; and wherein said component pattern processor processes each bit of the bit pattern in each of the unit blocks to correspond to different combinations in each bit of a predetermined logical variable value; a set of bits corresponding to a combination of the predetermined logical variable values, which makes a predetermined logical equation consisting of prime implicants true, component pattern corresponding to the head mark belonging to a set of the component patterns defined by the preceding matched codeword.

4. An image information code processing system for receiving bit pattern information including 2-valued image information and for encoding the 2-valued image information, the 2-valued image information including a plurality of expanded blocks each comprising a predetermined number of unit blocks with predetermined dimensions, each of the expanded blocks having a bit pattern, said system comprising:

component pattern supply means for supplying a plurality of component patterns constituting the bit pattern of each of the expanded blocks;

component pattern processor means for selecting the component patterns, one of the unit blocks located at a predetermined position in the expanded block being an object block, a set of the component patterns having a set of bits with a predetermined value in the bit pattern of the expanded block, and the selecting is performed based on a set of bits not expressed by the component patterns already selected for other unit blocks in the bit pattern of the object block belonging to the set of the component patterns, and for outputting matched codewords corresponding to the component patterns selected;

code processing means for encoding the 2-valued image information corresponding to the object block with a codeword train comprising the matched codewords from said component pattern processor means;

prediction pattern supply means for supplying a prediction pattern to predict the bit pattern of at lest one of the unit blocks; and prediction processor means for comparing the prediction pattern from said prediction pattern supply means with the bit pattern of the object block based on the bit pattern of the object block having a predetermined adjacent relationship, and for indicating coincidence based on the comparing; and wherein said component pattern processor means selects the prediction pattern as the component pattern when said prediction processor means indicates coincidence.

5. An apparatus for coding an image composed of unit blocks, each unit block grouped into expanded blocks so that each expanded block contains a plurality of the unit blocks, comprising:

component pattern supply means for supplying a predetermined set of patterns and corresponding in size to the expanded blocks;

component pattern processor means for comparing the unit blocks with the predetermined set of patterns until each expanded block substantially matches one pattern from the predetermined set of patterns;

code processing means for outputting a codeword train indicative of the matching one pattern;

prediction pattern supply means for supplying a prediction pattern to predict the image contained in a subject expanded block based on the codeword train corresponding to an expanded block adjacent to the subject expanded block; and prediction processor means for comparing the prediction pattern with the subject expanded block to indicate a coincidence; and wherein said code processing means comprises:
output means for outputting the codeword train corresponding to the at least one expanded block adjacent to the subject unit block when said prediction processor means indicates full coincidence.

6. An apparatus according to claim 5, wherein said component pattern processor means comprises:
pre-processing means for adding and removing unit blocks at edges of the image until each expanded block substantially matches the one pattern of the predetermined set of Karnaugh map patterns.

7. An apparatus according to claim 5, further comprising:
insertion means for inserting predetermined division marks between each codeword train.

8. An apparatus according to claim 7, wherein each codeword train includes one or more codewords and wherein said apparatus further comprises:
arrangement means for arranging the one or more codewords in a predetermined order.

9. An apparatus according to claim 8, further comprising:
suppression means for suppressing the insertion of division marks in accordance with the codeword preceding each division mark.

10. An apparatus according to claim 5, wherein each codeword train includes one or more codewords and wherein said code processing means further comprises:
partial output means for outputting at least one of the codewords included in the codeword train corresponding to the at least one expanded block adjacent to the subject expanded block when said prediction processor means indicates partial coincidence.

11. A method of coding an image composed of unit blocks, comprising the steps of:
- (a) grouping the unit blocks into expanded blocks so that each expanded block contains a plurality of the unit blocks;
- (b) comparing the unit blocks with a predetermined set of patterns until each expanded block substantially matches one pattern of the predetermined set of patterns, the predetermined set of patterns corresponding in size to the expanded blocks;
- (c) outputting a codeword train indicative of the matching one pattern;
- (d) supplying a prediction pattern to predict the image contained in a subject expanded block based on the codeword train corresponding to at least one block adjacent to the subject expanded block;
- (e) comparing the prediction pattern with the subject expanded block to indicate a coincidence; and
- (f) outputting the codeword train corresponding to the at least one expanded block adjacent to the subject expanded block when said step (e) indicates full coincidence.

12. A method according to claim 11, wherein said step (b) comprises the substep of:
- (b1) pre-processing the unit blocks by adding and removing unit blocks at edges of the image until each expanded block substantially matches the one pattern of the predetermined set of Karnaugh map patterns.

13. A method according to claim 11, wherein said step (c) further comprises the substep of:
- (c1) inserting predetermined division marks between each codeword train.

14. A method according to claim 13, wherein each codeword train includes one or more codewords and wherein said step (c) further comprises the substep of:
- (c2) arranging the one or more codewords in a predetermined order.

15. A method according to claim 14, wherein said step (c) further comprises the substep of:
- (c3) suppressing said insertion of division marks in accordance with the codeword preceding each division mark.

16. A method according to claim 11, wherein each codeword train includes one or more codewords and wherein said step (f) comprises the substeps of:
- (f1) outputting the codeword train corresponding to the at least one expanded block adjacent to the subject expanded block when said step (e) indicates full coincidence;
- (f2) outputting at least one of the codewords included in the codeword train corresponding to the at least one expanded block adjacent to the subject expanded block when said step (e) indicates partial coincidence.

* * * * *